United States Patent Office 3,352,803
Patented Nov. 14, 1967

3,352,803
PREPARATION OF FOAMED POLYURETHANE ELASTOMERS FROM (A) A POLYETHER, (B) DI-CYCLOHEXYLMETHANE DIISOCYANATE OR HEXAMETHYLENE DIISOCYANATE, (C) HYDROGEN PEROXIDE, (D) WATER, AND (E) A CATALYST
Wilfrid Henry Hogg, Sutton Coldfield, Cedric Hartle, Romily, and Peter Merriman, Birmingham, England, assignors to Dunlop Rubber Company Limited, a British company
No Drawing. Continuation of application Ser. No. 393,384, Aug. 31, 1964. This application Apr. 12, 1967, Ser. No. 630,460
Claims priority, application Great Britain, July 7, 1960, 23,731/60
16 Claims. (Cl. 260—2.5)

ABSTRACT OF THE DISCLOSURE

This invention relates to a method for the preparation of foamed polyurethane elastomers by a process which comprises reacting a polyurethane prepolymer having terminal isocyanato groups, being the reaction product of a polyether and dicyclohexylomethane diisocyanate or hexamethylene diisocyanate, with hydrogen peroxide, with water and with a catalyst to thereby expand the prepolymer into a foamed condition and to simultaneously effect cross-linking of the foamed polymer.

This application is a continuation of application Ser. No. 393,389 filed Aug. 31, 1964, and now abandoned.

This invention relates to foamed polyurethane elastomers.

This application is a continuation-in-part of copending application Ser. No. 119,272, filed June 26, 1961, now abandoned.

A known process for preparing foamed polyurethanes consists in reacting a polymer containing terminal reactive groups in the molecule with the appropriate amount of an aromatic polyisocyanate to form a liquid polymer which is then cross-linked by a suitable reagent such as water, an excess of polyisocyanate being provided. Isocyanato groups react with the water and the carbon dioxide evolved foams the product. Examples of polymers which can be used in this process are organic polyesters and polyethers containing terminal hydroxy groups in the molecule.

In the case of the slow reacting polyethers it has been necessary to carry out the reaction with at least a portion of the required polyisocyanate in a preliminary stage to produce a prepolymer which can then be cross-linked to form the polyurethane. More recently, however, adequately powerful catalysts have become available which are sufficiently urethane specific to enable the reactions resulting in foamed elastomers to be carried out without the separate preparation of the prepolymer; such catalysts will be referred to herein as "one-shot" catalysts.

The methods described above produce polyurethane foams which are suitable for use in many applications in which elastomers are required but they are not generally stable to light and, consequently, the products frequently discolour rapidly when exposed to light.

It is an object of this invention to provide a process for the production of light-stable polyurethane foams.

According to the present invention a method of producing a foamed polyurethane elastomer comprises mixing a polyurethane prepolymer, being the reaction product of a polyether containing at least two —OH groups in the molecule and an aliphatic or alicyclic diisocyanate, with hydrogen peroxide, with water, and with a catalyst to accelerate cross-linking with the prepolymer, and allowing the water to react with the prepolymer to form a cross-linked foamed polyurethane.

A polyether polyol containing terminal or substantially terminal hydroxy groups is reacted with the aliphatic or alicyclic diisocyanate, the resulting reaction product is mixed with water, the catalyst, a foam stabilizer and a source of hydrogen peroxide, and the mixture is poured into a mould where the foaming and cross-linking reactions take place.

Generally a non-aromatic polyether polyol is used, and in such cases the polyether polyol preferably possesses at least three carbon atoms in its repeated monomer unit. The polyether polyols which may be employed in the method of the invention have molecules made up basically of a series of carbon-chain units joined together by links comprising an oxygen atom or a sulphur atom, the molecules also having at least two terminal or substantially terminal hydroxy or mercapto groups capable of reaction with the organic polyisocyanate or polyisothiocyanate.

Particularly suitable polyether polyols are the straight-chain polypropylene ether glycols having a molecuar weight of from 750 to 5,000, and the branched chain polyether polyols of molecular weight from 1,000 to 10,000 which have three or more terminal or substantially hydroxy groups. Such branched chain polyols are obtained, for example, by "growing" propylene oxide chains on to a polyfunctional branching agent such as triethanolamine or triisopropanolamine, so that each side chain contains from 8 to 24 propylene oxide units and terminates in a primary or secondary hydroxy group. Other branched chain polyether polyols are those obtained by growing propylene oxide and/or ethylene oxide chains on to the nitrogen atom of ethylene diamine, or on to the hydroxy groups of polyhydric alcohols such as glycerol or trimethylol propane. The branched-chain polyols may be used alone or mixed with one or more straight-chain polyols.

Examples of suitable polyether polyols are the polyglycols, i.e. the polyether diols. Typical polyglycols which may be used are: poly-1,2-propylene glycol; poly-1,3-propylene glycol; polyethylene glycols; polyglycols derived from mixtures of ethylene glycol and propylene glycols; polybutylene glycols (including polytetrahydrofuran); aryl substituted glycols (e.g. polyphenylethylene glycol or polystyrene glycol) and halogen-substituted polyglycols, (e.g. polychlorethylene glycol or polyepichlorhydrin). The polythioglycols or a compound containing both ether and thioether linkages may also be used. Polydiglycols, i.e. compounds of the formula $H(OCH_2CH_2O \cdot CH_2CH_2O \cdot CH_2)_nOH$ wherein $n$ represents an integer of from 1 to 50 may also be used.

A non-aromatic peroxide such as barium peroxide may be employed as the source of hydrogen peroxide.

The diisocyanate or diisothiocyanate which is used can be an aliphatic or alicyclic compound, and when an aliphatic diisocyanate or diisothiocyanate is used, then the aliphatic group is preferably a straight-chain aliphatic group. Examples of suitable diisocyanates are dicyclohexyl methane diisocyanate and hexamethylene diisocyanate. The amount of the diisocyanate, used will usually be slightly in excess of the amount required to react with all the terminal hydroxy or thiol groups, so that the prepolymer produced by reacting the diisocyanate with the polyether polyol contains at least two terminal or substantially terminal isocyanato groups in the molecule. Generally from two to three moles of the diisocyanate will be used per mole of the polyether polyol.

The hydrogen peroxide can conveniently be added in the form of a solution, and in this case the amount used will depend upon the concentration of the solution. For instance, if a 90 percent to 95 percent solution of hydrogen peroxide is used, then the amount used is usually about 1 part by weight based on the weight of the polyurethane prepolymer. However, amounts within the range of 0.5 to 2.5 parts per 100 parts of the prepolymer may be used.

The one-shot catalysts which may be employed include triethylene diamine, and alkyl metallo-esters of fatty acids, more particularly dialkyl tin diesters wherein the number of carbon atoms is from 3 to 5 in each alkyl group, for example dibutyl tin dilaurate, and suitable divalent tin soaps for example stannous octoate, and mixtures thereof. The amount of the catalyst used will usually be from 0.05 part to 1.5 parts per 100 parts of the polyol.

Preferably an aliphatic polyether is heated with an aliphatic diisocyanate under substantially anhydrous conditions and the resulting prepolymer mixed with the catalyst, a silicone oil as the foam stabiliser, and a concentrated aqueous solution of hydrogen peroxide.

The ageing resistance of the foam produced may be enhanced by the inclusion in the formulation of non-staining antioxidants such as the alkylene bis-dialkyl dithiocarbamates described in our co-pending application of Watson, Ser. No. 119,297, filed June 26, 1961, now Patent 3,151,098.

The invention will be illustrated by the following Examples, in which the parts are by weight:

*Example I*

100 parts of a polypropylene ether glycol of an average molecular weight of 2,000 and 46.9 parts of dicyclohexylmethane diisocyanate were stirred in a glass vessel into which a slow stream of oxygen-free nitrogen was fed. The mixture was heated and maintained at 100° C. for 8 hours, the flow of nitrogen being continued. After cooling the resulting prepolymer was a clear colourless, syrupy liquid.

0.1 part of dibutyl tin dilaurate, 3.0 parts of water, 0.5 part of silicone oil having a viscosity of 50 cps., and 1.0 part of a 90 percent to 95 percent solution of hydrogen peroxide were mixed into the prepolymer, using a high speed stirrer. The mixture was agitated for 2 minutes and then poured into open top folded paper boxes and placed in an oven at 100° C.

After 2–3 minutes the mixture commenced to inflate and after 15 minutes had gelled to produce a foam of uniform structure. The mouldings were removed from the boxes and compressed between rollers to break any closed cells when a soft, resilient, foamed material with a density of 0.06 gm. per cc. was obtained having a pleasing white appearance.

For purposes of comparison the foams prepared were exposed to natural daylight for extended periods, and to ultraviolet artificial light together with films prepared conventionally using tolylene diisocyanate.

In both cases the foams prepared from unsubstituted aromatic diisocyanate became discoloured but in neither case did the foams prepared according to the invention undergo discolouration.

*Example II*

The procedure of Example I was repeated using:

100 parts of Niax triol LG–56, a polypropylene ether triol prepared by reacting propylene oxide with glycerol and having an average molecular weight of 3,000, and
38.1 parts of dicyclohexylmethane diisocyanate, 0.1 part of dibutyl tin dilaurate,
1.0 part of water,
0.5 part of the silicone oil, and
1.0 part of the hydrogen peroxide solution.

A resilient foamed material with a density of 0.07 gm. per cc. was obtained having a pleasing white appearance and a little more firmness than that of Example I.

The comparative test for stability to light was repeated with similar, satisfactory results.

*Example III*

Prepolymers were prepared as in Examples I and II, stirred with the respective additives, including the hydrogen peroxide and allowed to stand in an open vessel at room temperature for 2 hours.

No evidence of gas generation was observed, and soft resilient foamed moulds were then prepared as noted above.

*Example IV*

The procedures of Examples I and II were repeated using 1 part of triethylene diamine in place of the dibutyl tin dilaurate.

In both cases the foaming reactions, and the characteristics of the foams obtained, were similar to those noted.

*Example V*

100 parts by weight of polypropylene ether triol of an average molecular weight of 3,000 and 25.2 parts of hexamethylene diisocyanate were stirred in a glass vessel under nitrogen for 15 hours at 90° C. After cooling, the resulting clear, colourless syrup was stirred with 1 part of 20-volume hydrogen peroxide, 1 part of L–520 silicone oil (an alkylene oxide siloxane copolymer), 2 parts of water and 0.2 part of stannous octoate.

The mixture foamed up within 8 minutes and the resulting stable foam was heated for 2 hours at 90° C. in a hot-air oven. The product was a strong, water-white resilient foam which did not discolour on exposure to sunlight or ultraviolet light for long periods.

We claim:
1. A method of producing a foamed polyurethane elastomer which comprises mixing a polyurethane prepolymer having terminal isocyanato groups, being the reaction product of a polyether containing at least two —OH groups in the molecule and dicyclohexylmethane diisocyanate with hydrogen peroxide, with water and with a catalyst selected from the class consisting of triethylene diamine, dialkyl tin diesters of fatty acids having from 3 to 5 carbon atoms in each alkyl group and divalent tin soaps, and allowing the water to react with the polyurethane prepolymer to expand the prepolymer into a foamed condition, and simultaneously effect cross-linking of the foamed prepolymer.

2. A method according to claim 1 in which the polyether is an aliphatic polyether.

3. A method according to claim 2 in which the polyether has at least three carbon atoms in the repeated monomer unit.

4. A method according to claim 1 in which the hydrogen peroxide is added in the form of a 90 to 95 percent solution.

5. A method according to claim 4 in which the amount of the hydrogen peroxide solution is from 0.5 percent to 2.5 percent by weight based on the weight of the polyurethane prepolymer.

6. The method of claim 1 in which said prepolymer is formed in an atmosphere of oxygen-free nitrogen.

7. The method of claim 1 in which from 2 to 3 mols of diisocyanate are used for one mol of the polyether.

8. A method of producing a foamed polyurethane elastomer which comprises mixing a polyurethane prepolymer having terminal isocyanato groups, being the reaction product of a polypropylene ether glycol and dicyclohexylmethane diisocyanate, with hydrogen peroxide, with water and with dibutyl tin dilaurate, and heating the mixture to 100° C. to form a foamed polyurethane elastomer.

9. A method of producing a foamed polyurethane elastomer which comprises mixing a polyurethane prepolymer having terminal isocyanato groups, being the reaction product of a polyether containing at least two —OH groups in the molecule and hexamethylene diisocyanate with hydrogen peroxide, with water and with a catalyst selected from the class consisting of triethylene diamine, dialkyl tin diesters of fatty acids having from 3 to 5 carbon atoms in each alkyl group and divalent tin soaps, and allowing the water to react with the polyurethane prepolymer to expand the prepolymer into a foamed condition, and simultaneously effect cross-linking of the foamed prepolymer.

10. A method according to claim 9 in which the polyether is an aliphatic polyether.

11. A method according to claim 10 in which the polyether has at least three carbon atoms in the repeated monomer unit.

12. A method according to claim 9 in which the hydrogen peroxide is added in the form of a 90 to 95 percent solution.

13. A method according to claim 12 in which the amount of the hydrogen peroxide solution is from 0.5 percent to 2.5 percent by weight based on the weight of the polyurethane prepolymer.

14. The method of claim 9 in which said prepolymer is formed in an atmoshpere of oxygen-free nitrogen.

15. The method of claim 9 in which from 2 to 3 mols of diisocyanate are used for one mol of the polyether.

16. A method of producing a foamed polyurethane elastomer which comprises mixing a polyurethane prepolymer having terminal isocyanato groups, being the reaction product of a polypropylene ether triol and hexamethylene diisocyanate, with hydrogen peroxide, with water and with stannous octoate, and allowing the water to react with the polyurethane prepolymer to expand the prepolymer into a foamed condition and simultaneously effect cross-linking of the foamed prepolymer.

References Cited

UNITED STATES PATENTS

| | | | |
|---|---|---|---|
| 2,977,330 | 3/1961 | Brower | 260—2.5 |
| 3,022,256 | 2/1962 | Barnes et al. | 260—2.5 |
| 3,087,901 | 4/1963 | Brown | 260—2.5 |

FOREIGN PATENTS 879,056  10/1961  Great Britain.

OTHER REFERENCES

Hampton et al.: "Oil and Colour Chemists Assn. Journal," vol. 43, No. 2, February 1960, pp. 92–123; pp. 110 and 111 relied upon.

DONALD E. CZAJA, *Primary Examiner.*

G. W. RAUCHFUSS, *Assistant Examiner.*